United States Patent
Grams

(10) Patent No.: US 8,125,660 B2
(45) Date of Patent: Feb. 28, 2012

(54) SYSTEMS AND METHODS FOR PROCESSING PAGE DESCRIPTION LANGUAGES

(75) Inventor: Jason J. Grams, Broomfield, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1006 days.

(21) Appl. No.: 12/058,563

(22) Filed: Mar. 28, 2008

(65) Prior Publication Data

US 2009/0244592 A1 Oct. 1, 2009

(51) Int. Cl.
*G06F 15/00* (2006.01)
*G06F 3/12* (2006.01)
*G06K 1/00* (2006.01)
*G06K 15/00* (2006.01)

(52) U.S. Cl. ............................ 358/1.13; 358/1.18

(58) Field of Classification Search .......... None
See application file for complete search history.

(56) References Cited

U.S. PATENT DOCUMENTS

2005/0063010 A1* 3/2005 Giannetti .................... 358/1.18
2005/0125724 A1* 6/2005 Peiro et al. .................... 715/517

* cited by examiner

*Primary Examiner* — Douglas Tran
(74) *Attorney, Agent, or Firm* — Finnegan, Henderson, Farabow, Garrett & Dunner, L.L.P.

(57) ABSTRACT

Systems and methods consistent with embodiments presented provide methods for processing page description language (PDL) objects embedded in Personalized Print Markup Language (PPML) page descriptions while retaining the ability to process supported native PDL documents. In some embodiments, PPML print data can be parsed to identify a language object written in at least one client PDL. A language processor for the client PDL can then be invoked using a language entry point function. In some embodiments, a language entry table or table of language entry points can be used to map the PDL to the language entry point function. Methods are also presented for processing page layout data in accordance with the PPML layout when processing PDL objects using the client PDL language processor.

25 Claims, 7 Drawing Sheets

| Enumeration | Language Entry Point Function |
|---|---|
| PPML_POSTSCRIPT | ppml_PostscriptEntry |
| PPML_PDF | ppml_PDFEntry |
| PPML_TIFF | ppml_TIFFEntry |
| PPML_JPEG | ppml_JPEGEntry |

FIG. 7

SYSTEMS AND METHODS FOR PROCESSING PAGE DESCRIPTION LANGUAGES

BACKGROUND

1. Field of the Invention

The present invention relates to the field of printing and in particular, to systems and methods for processing Page Description Languages (PDLs) in the context of Personalized Print Markup Language (PPML).

2. Description of Related Art

Document processing software allows users to view, edit, process, and store documents conveniently. Pages in a document may be displayed on screen exactly as they would appear in print. However, before the document can be printed, the data must be converted into a form that can be recognized and used by a printer. To do this, pages in the document are often described in a page description language (PDL). A PDL is used to create instructions which can be sent to a printer or a display device in order to produce a desired set of viewable output. These instructions generally include means for describing the layout of the viewable output even when the final output is not to a physical medium. As used in this application PDLs may include PostScript™, Adobe™ PDF, HP™ PCL™, Microsoft™ XPS™, and variants thereof as well as any other languages used to describe pages in a document.

A PDL description of a document provides a high-level description of each page in a document. This PDL description is often translated to a series of lower-level printer-specific commands when the document is being printed. The printer or printing device can use the low-level printer-specific commands to place marks on a print medium. The various flavors of PDLs offer different advantages for different applications. For example, some PDLs can provide better or faster printing performance, while others can provide higher graphical quality with certain types of viewable data and/or graphical applications.

One class of PDL languages include those governed by the Personalized Printer Markup Language (PPML) specification, which permits printer languages to identify, store, and re-use text and graphic elements. PPML can be an XML-based language and can speed up the printing of certain print jobs by permitting the storage and re-use of text and graphic elements thus reducing rasterization and bandwidth overheads. PPML allows printers to manipulate data components at the object level instead of at the page level. In other words, by lowering the granularity of the information stored by a printer to the object-level, PPML allows code to attach names to objects and re-use the objects as needed during the process of printing of variable-data print jobs.

Before the introduction of PPML, printing architectures were developed using the framework that written instructions would be provided in a single PDL, and PDLs would be processed to determine and format the layout of the page being printed. In this sense, non-PPML PDLs are page-based languages in that each PDL has its specific approach to separately describe the layout of a page and its contents. Other features of printing architectures, such as language determination, selection, and initiation were also based upon this framework.

With the introduction of PPMLs, one or more PDLs may be called to render portions of a page and standard page-based processing methods such as page layout and language identification methods can be adapted for use in a PPML context. Therefore there is a need for flexible and efficient schemes for PDL language processing outside of the context of the traditional single PDL to single page framework, while retaining the capability for language processing to occur in a page-based context.

SUMMARY

In accordance with the present invention, systems and methods for print resource management are presented. In some embodiments, a method is presented for processing Personalized Print Markup Language (PPML) print data for at least one document page, wherein the PPML print data comprises at least one language object described in at least one client page description language (PDL), and the method comprises parsing the PPML print data for the at least one document page to identify the at least one language object written in at least one client PDL, mapping the at least one language object to a language entry point function for the client PDL, calling the language processor for the at least one client PDL using the language entry point function, and processing the at least one language object using the language processor for the at least one client PDL.

Embodiments of the present invention also relate to methods for processing page layout instructions using a PDL. These and other embodiments are further explained below with respect to the following figures.

BRIEF DESCRIPTION OF THE DRAWINGS

FIG. 7 shows an exemplary table of language entry points for use in a system for processing a PDL using PPML.

DETAILED DESCRIPTION

In accordance with embodiments reflecting various features of the present invention, systems and methods for PDL language processing outside a page-based context are presented. In addition, systems and methods are presented for processing PDL instructions outside a page-based context while maintaining the ability to process PDL instructions in a page-based context.

Figure 1:
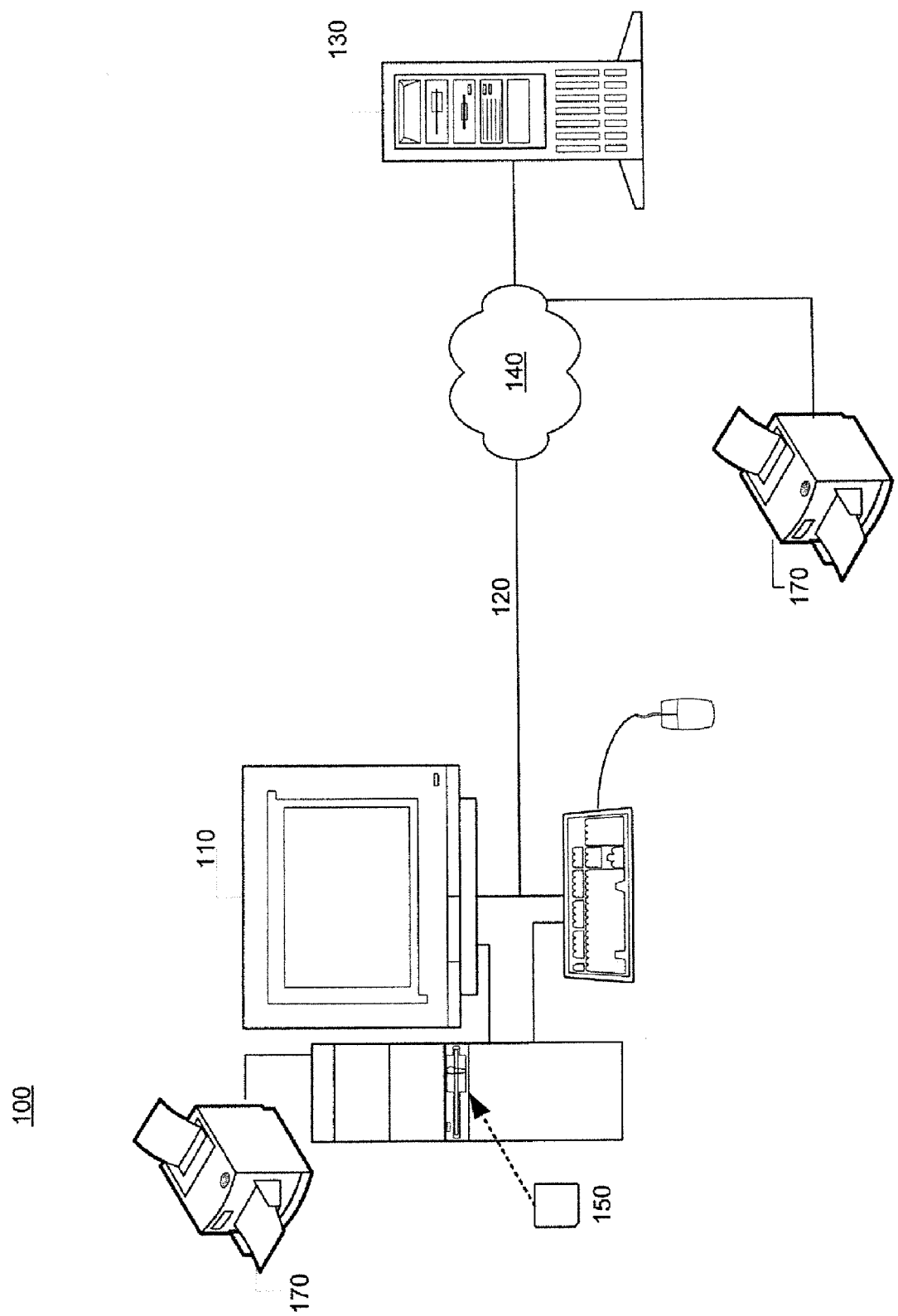
FIG. 1 shows a block diagram illustrating components in a system for printing documents.

FIG. 1 shows a block diagram illustrating components in a system for printing documents according to some embodiments of the present invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL or PPML descriptions of documents for printing. Note, too, that document print processing can be distributed. Thus, computing device 110, server 130, and/or printer 170 may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet™, USB, SCSI, FIREWIRE™, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with embodiments of the present invention that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments of the present invention. A computer software application consistent with the present invention may be deployed on any of the exemplary computers and printers, as shown in FIG. 1. For example, computing device 110 could execute software that may be downloaded directly from server 130. In some embodiments, portions of a software application may reside on removable media and be read and executed by computing device 110 using removable media drive 150. Portions of the application may also be executed by printer 170 in accordance with some disclosed embodiments.

Figure 2:
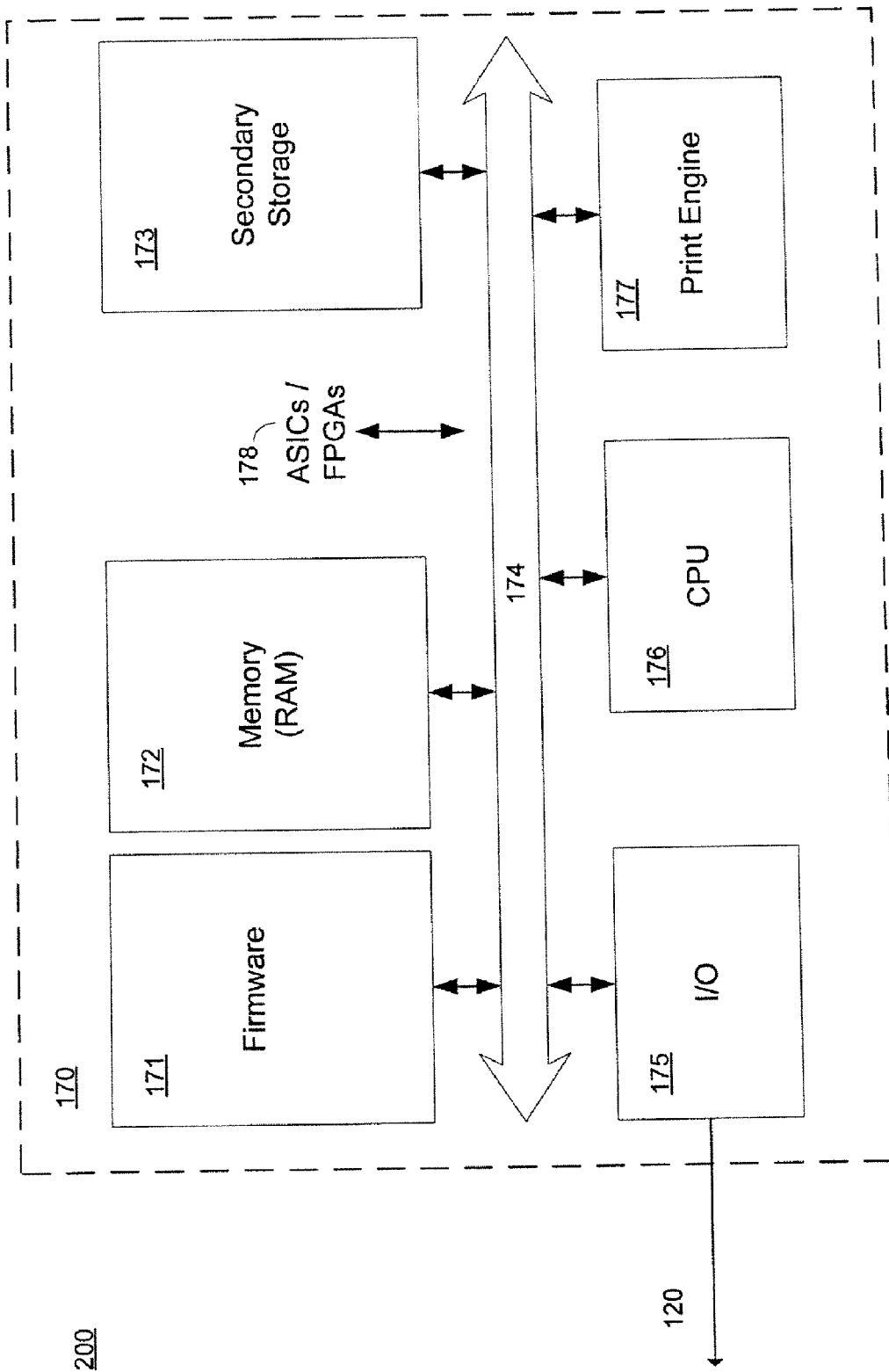
FIG. 2 shows a high-level block diagram of an exemplary printer.

FIG. 2 shows a high-level block diagram 200 of exemplary printer 170. In some embodiments, printer 170 may contain bus 174 that couples central processing unit (CPU) 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to process PPMLs according to one or more disclosed embodiments. In another embodiment, printer 170 may also be able to access secondary storage or other memory in computing device 110 using I/O ports 175 and connection 120 or network 140. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory (DRAM) such as but not limited to SDRAM, or RDRAM. Firmware 171 may hold instructions and data including but not limited to a boot-up sequence, pre-defined routines, and other code. In some embodiments, code and data for processing PPML may reside in firmware 171 may be copied to memory 172 prior to being acted upon by CPU 176. Routines in firmware 171 may include code to translate PDL or PPML page descriptions received from computing device 110. In some embodiments, firmware 171 may include routines to process PPMLs, including one or more PDLs. Firmware 171 may also include routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. ASICs/FPGAs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL or PPML description of a document.

In some embodiments, the translation process from a PDL or PPML description of a document to the final printable data comprising of a series of lower-level printer-specific commands may include the generation of intermediate printable data comprising of display lists of objects. In some embodiments, display lists may be stored in memory 172 or secondary storage device 173. Exemplary secondary storage device 173 may be an internal or external hard disk, memory stick, or any other memory storage device capable of being used system 200. In some embodiments, the display list may reside in one or more of printer 170, computing device 110, and server 130.

Figure 3:
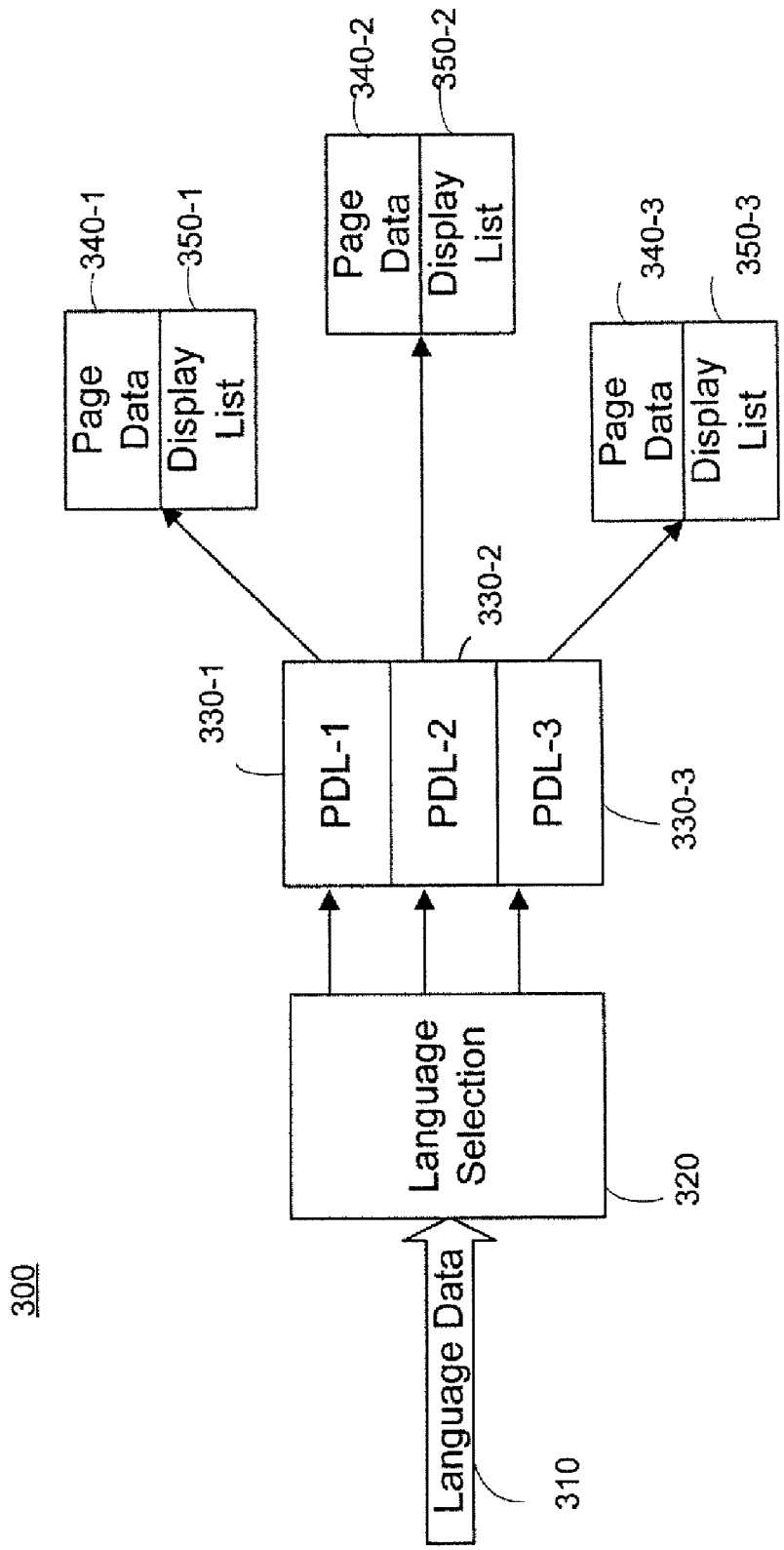
FIG. 3 shows an exemplary high-level architecture of a system for page description processing using a PDL.

FIG. 3 shows an exemplary high-level architecture 300 of a system for page description processing using a PDL. Language selection routine 320 can be used to determine the PDL used to process a print job with language data 310 that is received for processing at printer 170. For example, language selection routine 320 can inspect header data in the print job to determine the PDL used in the print job. Language selection routine 320 is sometimes also called a "sniffer." Language selection routine 320 may also determine an entry point for the PDL language processor 330 and can invoke PDL language processor 330 at the appropriate entry point. PDL language processor 330 can process the print job to generate display list 350 and page layout data 340 that are specific to PDL. Display list 350 can then be rendered to place print marks on a print medium using print engine 177. The processing involved in language selection routine 320 and performed by PDL language processor 330 may be performed using one or more of firmware 171, CPU 176, and/or print engine 177 and may further utilize ASICs/FPGAs 178. Display list 350 may be stored in memory 172 and/or secondary storage device 173. All or portions of the processing involved in language selection routine 320 and performed by PDL language processor 330 may also be implemented within a host controller on computing device 110.

Figure 4:
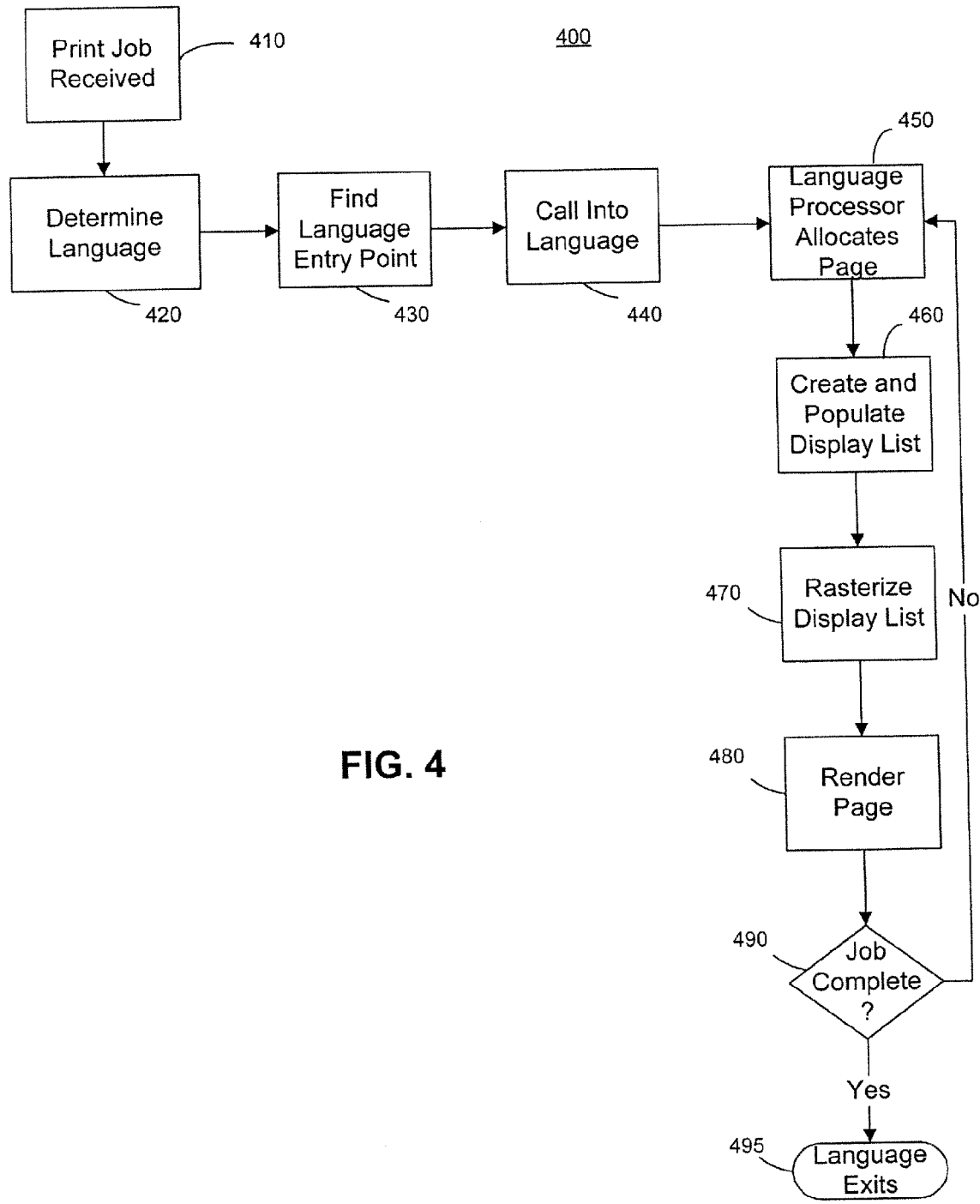
FIG. 4 shows an exemplary flowchart illustrating traditional page description language processing.

FIG. 4 shows an exemplary flowchart 400 illustrating traditional page description language processing. As shown in FIG. 4, in step 410, a print job may be received for processing. Next, in step 420, the PDL used in the print job may be determined. In step 430, the algorithm may determine an entry point to invoke the PDL language processor 330. Next, in step 440, PDL language processor 330 may be invoked. For example, language selection routine 320 running on printer 170 may operate on the print job received by print engine 177 to determine an entry point and invoke the appropriate PDL language processor 330.

Page layout data 340 specific to PDL may be determined and set by PDL language processor 330 in step 450. After PDL language processor 330 has been called, display list 350 or any other intermediate form of print data specific to PDL may be created and populated with appropriate objects in step 460. Next, in step 470, display list 350 is rasterized and, in step 480, the page may be rendered. For example, objects in the display list 350 may be rendered into a frame buffer, which may reside in memory 172. In traditional processing, separate and distinct display lists such as exemplary display lists 350-1, 350-2, and 350-3 may be created, updated, and maintained for individual PDL by PDL language processors, 330-1, 330-2, and 330-3, respectively. Accordingly, in traditional methods, the invocation of a new PDL in a print job may lead to the creation of a new display list to process objects generated by one of PDL language processors 330 for the new PDL.

Next, in step 490, a determination can be made as to whether the print job is complete. If the print job has completed then the algorithm may terminate and enter a wait state where it awaits the next job. For example, a print job may be marked as complete when all print instructions have been processed and pages rendered, the print job is complete, and in step 495 the controller may exit PDL language processor 330. If the print job is not complete, the algorithm may return to step 450 and iterate through the subsequent steps until the processing of the print job has been completed. As shown in FIGS. 3 and 4, in traditional processing, PDL language processor 330 can process instructions in a print job and create and populate display list 350. Such page-based processing is common in traditional PDLs.

Figure 5:
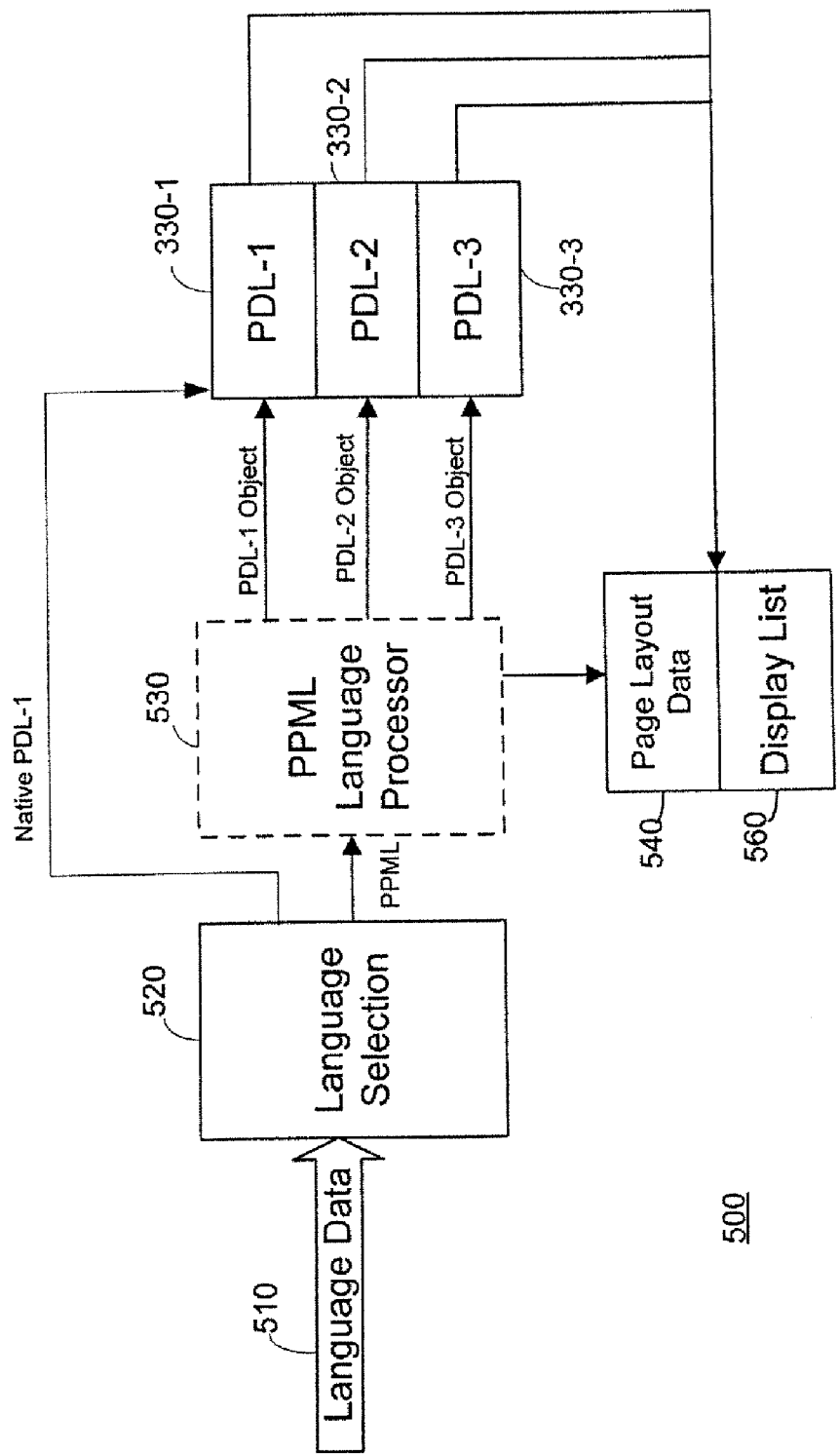
FIG. 5 shows an exemplary high-level architecture of a system for page description processing using PPML and one or more client PDLs.

FIG. 5 shows an exemplary high-level architecture 500 of a system for page description language processing using PPML and one or more client PDLs. As shown in FIG. 5 and discussed in more detail below, language selection routine 520, or sniffer, may be used to determine the PDL used to process a print job with language data 510 that is received for processing at printer 170. For example, language selection routine 520 may inspect header data in the print job to determine language used in the print job. In one embodiment, language selection routine 520 may classify a print job as PPML by analyzing header data in the print job. In some embodiments, language selection routine 520 may determine an entry point for the PPML language processor 530 and can invoke PPML at an appropriate entry point. PPML language processor 530 can process the print job to generate display list 560 and page layout data 540 that are specific to PPML.

A print job implemented in PPML can include one or more language and/or graphical objects described in one or more non-PPML PDLs. PPML can be seen as a type of PDLs that permit instructions in various individual PDLs to be used for page description purposes. These non-PPML PDLs can be invoked by PPML language processor 530 and are often called client PDLs. In some embodiments, client PDLs can include one or more of object formats and image formats, such as, for example, JPEG and TIFF. The set of client PDLs includes the range of PDLs that can be embedded in a PPML description of a print job. For example, PPML print data for a page description can include descriptions of graphical content using language objects, in various different PDLs. Thus, a page description in PDL could include one graphical language object that could be described in Adobe™ PDF, while another graphical language object on the same page could be described in PostScript™. PPML offers the capability to describe graphical output in various PDLs, so that the advantages afforded by individual PDLs in describing specific objects can be maintained and any attendant increases overall print quality and/or speed exploited. In addition, PPML can leverage tools and graphical assets previously developed for existing PDLs. In one embodiment, the user or program producing a PPML description of a document or the PPML itself can determine the set of client PDLs that can be used for particular graphical language objects. Accordingly, tradeoffs between print quality, processing speed, and other job parameters can be controlled across various applications.

In some embodiments, when the PPML language processor 530 encounters a language object in the print job, PPML language processor 530 may invoke an appropriate PDL language processor 330 for client PDL at an appropriate entry point. PDL language processor 330 for client PDL processes the print job to populate display list 560 being created and/or used by PPML language processor 530, which can be specific to the PPML print data processed by PPML language processor 530. For example, PPML language processor 530 may operate on the print job including PPML print data, which further includes one or more language objects in PDL-1 and PDL-2, to determine entry points and invoke the appropriate client PDL language processors 330-1 and 330-2. In some embodiments, at the time of invocation of one of client PDL language processors 330, PPML language processor 530 may include information about the location of page layout data 540 and display list 560 to allow appropriate client PDL language processor 330 to process language objects and populate display list 560. In one embodiment, after the client PDL language processor 330 has been invoked, display list 560 or any other intermediate form of print data specific to PPML may be populated with appropriate objects by client PDL. In one embodiment, page layout data 540, which can include PPML page layout data for a document, may be determined and set by PPML language processor 530 when PPML language processor 530 encounters page layout instructions while processing the page data for the print job. PPML page layout data 540 may include page size and/or graphical object size data, where the language objects themselves may be described in one or more client PDLs.

After the PPML language processor 530 has determined that language objects in the print data have been processed, display list 560 can be rendered to place print marks on a print medium using print engine 177. The processing involved in language selection routine 520 and performed by PPML language processor 530 and one or more of client PDL language processors 330 may be performed using one or more of firmware 171, CPU 176, and/or print engine 177 and may further utilize ASICs/FPGAs 178. Display list 560 or another memory location may be stored in memory 172 and/or secondary storage device 173. All or portions of the processing involved in language selection routine 520 and performed by the PPML language processor 530 and/or client PDL language processors 330 may also be implemented within a host controller on computing device 110.

In some embodiments, if a job is entirely described in a single non-PPML PDL language, then language selection routine 520 may directly invoke the appropriate PDL language processor 330 at its normal entry point. Accordingly, the job will be processed in accordance with the normal process flow for a PDL document. In some embodiments, system architecture 500 may be implemented as a layer over an existing PDL processing architecture to leverage existing functionality with minimal changes to underlying code.

Figure 6:
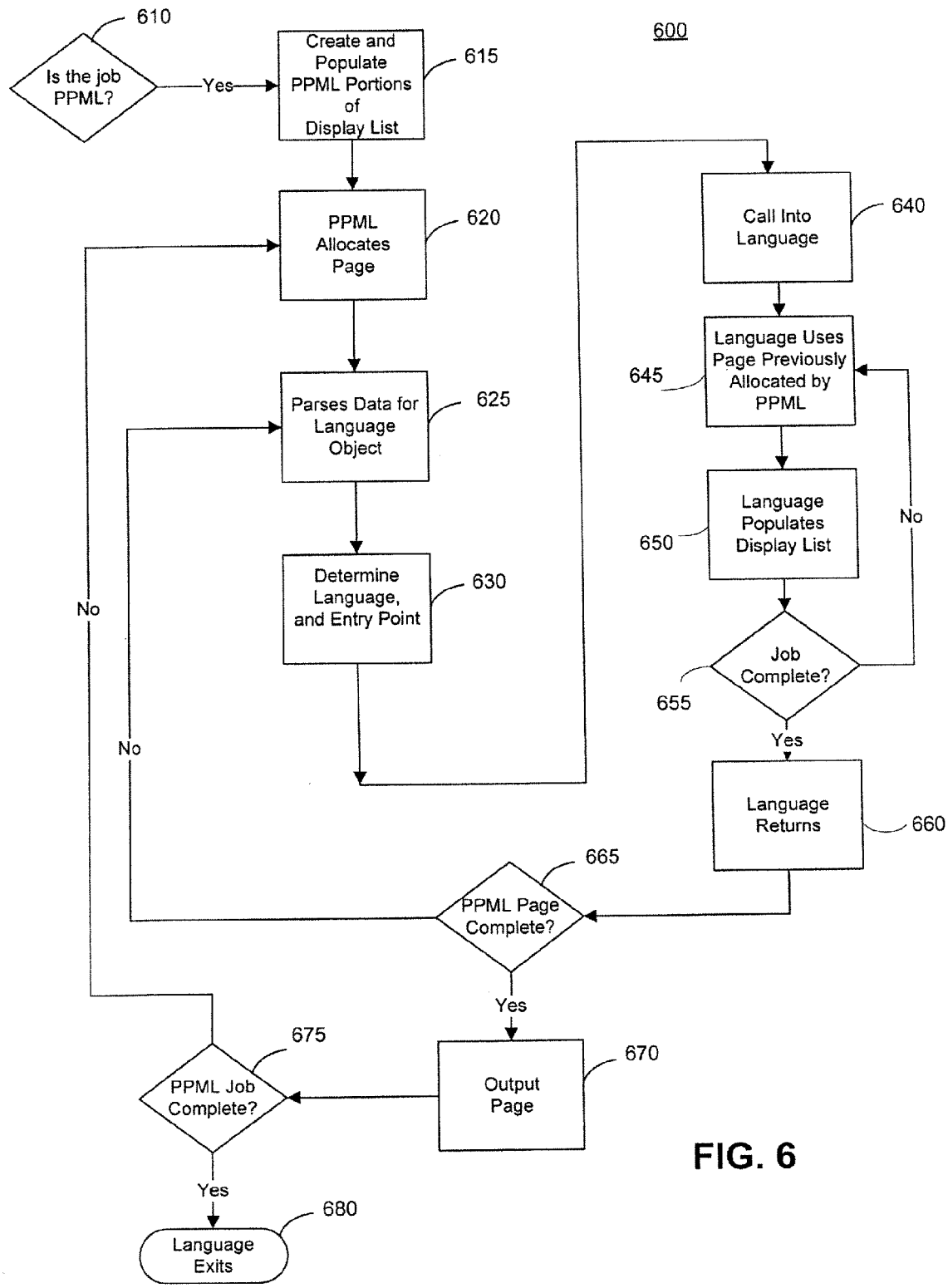
FIG. 6 shows a flowchart illustrating portions of an exemplary algorithm for processing PPML data that incorporates PDL objects in one or more languages.

FIG. 6 shows a flowchart 600 illustrating portions of an exemplary algorithm for processing PPML data that incorporates PDL objects in one or more languages. As shown in FIG. 6, in step 610, a print job received for processing at printer 170 may be analyzed to determine the language used in the print job. For example, language selection routine 520 may analyze header data in the print job to determine the language used. In step 615, if it is determined that the language used is PPML then initialization and other PPML specific functions may be performed. In some embodiments, these functions could include creating and initializing a display list. In some embodiments, the functions may be performed by PPML language processor 530. Page layout data 540 specific to PPML may be determined and set in step 620. In some embodiments, page layout data 540 specific to PPML can be determined and set by the PPML language processor 530.

If it is determined that a non-PPML PDL was used in the print job, an entry point may be determined for invoking PDL language processor 330. For example, this step may be performed by language selection routine 520. Subsequently, processing the print job may proceed in accordance with the methods shown and discussed above in connection with FIGS. 3 and 4. In some embodiments, this processing is performed by PDL language processor 330.

In step 625, the print job, or PPML print data, for one or more document pages, may be parsed until a language object within the PPML print instructions is encountered. This parsing may be done, for example, by PPML language processor 530. Once a language object is found within a PPML print job, at step 630 a language entry point for the relevant client PDL for the language object is determined or mapped. This determination or mapping may, in one embodiment, be performed by PPML language processor 530. For example, to make this determination, PPML language processor 530 may be provided with a table of language entry points for one or more client PDLs.

PDL language processor 330 may then be invoked at step 640. In one embodiment, PDL language processor 330 can be invoked by PPML language processor 530 using a language entry point function. In one embodiment, PDL language processor 330 for client PDL may be invoked using an Application Programming Interface (API). An address to a memory location for display list 560 and/or other structures used by the client PDL may be provided to PDL language processor 330 at the time of invocation. In one embodiment, PDL language processor 330 for client PDL may locate and store graphical output in display list 560 using the address provided. In one embodiment, this starting address may be the address of display list 560 already created by PPML language processor 530 for PPML print data. In one embodiment, an API may be used to invoke PDL language processors 330 and parameters provided to the API may describe both the entry points into individual client PDLs and memory locations, such as display list 560, that are specific to PPML or PPML print data processed by PPML language processor 530. For example, PPML language processor 530 may provide the API and/or starting address to PDL language processor 330 for client PDL.

In one embodiment, at step 645, the language object may be parsed further to produce graphical output according to page layout data 540. In one embodiment, PDL language processor 330 performs this function. Page layout data 540 may be used to format or otherwise transform the graphical output. In one embodiment, the PDL language processor 330 for client PDL may apply the page layout data 540 previously determined by PPML language processor 530.

In some embodiments, access to PPML page layout data 540 may be provided to the PDL language processor 330 for the client PDL when the PDL language processor 330 for the client PDL is invoked at step 640. In one embodiment, an API may be provided to one or both of PPML language processor 530 and PDL language processor 330 for client PDL and may describe the entry point for page layout data 540 in PPML.

In one embodiment, a determination may be made that PDL language processor 330 for client PDL is operating in "client mode" and PPML page layout data 540 may be retrieved and applied at step 645. For example, client PDL language processor 330 may determine that it is operating in a client mode upon identifying a PDL layout instruction. It can then retrieve and apply PPML page layout data 540 previously determined by PPML language processor 530 to the graphical output.

In one embodiment, a determination may be made that a PDL language processor 330 for client PDL is not operating in a client mode and PDL page layout data 340 specific to the PDL may be determined or set. In one embodiment, these determinations are made by PDL language processor 330. For example, when a print job is described entirely in a single PDL, then, as shown in FIG. 5, PDL language processor 330 may be directly invoked and may operate in native mode. Accordingly, in some embodiments, the PDL page layout data 340 can be determined or set using one or more PDL layout instructions, similar to the operation of PDL language processor 330 outside of the context of PPML as described above in FIGS. 3 and 4. For example, the one or more PDL layout instructions may include page size instructions and/or a graphical object size instructions.

Display list 560 can be populated with appropriate objects at step 650. For example, PDL language processor 330 for client PDL may perform this function. Next, a determination may be made as to whether the client PDL print job is complete at step 655. If the client PDL job is complete, the client PDL language processor 330 exits and returns to the PPML language processor 530 at step 660. If the client print job is not complete, the algorithm may return to step 645 and iterate through the subsequent steps until the processing of the PDL print job has been completed.

A determination may be made as to whether the PPML page is complete at step 665. If the PPML page is complete, the display list 560 may be rasterized and the page may be rendered. If the PPML page is not complete, the algorithm may return to step 625 and iterate through the subsequent steps until the processing of the PPML page has been completed. Specifically, the document page may include additional language objects for processing using one or more client PDL. After the PPML page is complete, a determination may be made as to whether the PPML print job is complete at step 675. If the PPML print job is complete, PPML language processor 530 exits at step 680. If the print job is not complete, processing continues at step 620 iterating through the subsequent steps until the processing of the print job has been completed.

In some embodiments, a determination as to whether the print job is a PPML print job may be made prior to implementing a PDL layout instruction or applying PPML page layout data. In some embodiments, a determination may also be made as to whether the print job is a PPML print job prior to outputting graphical output to display list 560 or display list 350. For example, PDL language processor 330 may perform these functions.

As shown in FIG. 6, processing may occur in a page-based manner. In one embodiment, the PDL language processor 330 for client PDL can operate as if it was executing a page-based print job. In this sense, printer architectures utilizing page-based PDL processing can continue to process PDL print jobs, while additionally supporting PPML functionality for print jobs provided in PPML.

FIG. 7 shows an exemplary table of language entry points 700 for use in a system for processing a PDL using PPML. As shown in FIG. 7, table of language entry points 700 may include language enumerations 710-740 and language entry points 750-780. In one embodiment, table 700 may be provided to PPML language processor 530. Although shown with language enumerations 710-740 and language entry point functions 750-780, table 700 may include additional or fewer language enumerations and language entry point functions. Language entry point functions 750-780 are functions called by PPML language processor 530 to invoke PDL language processor 330 for client PDL.

In one embodiment, PPML language processor 530 receives a portion of print data, such as a language definition instruction, when it encounters a language object. In one embodiment, a language definition instruction in a PPML instruction may be a part of the Format attribute of the SOURCE element for a language object processed by PPML language processor 530. PPML language processor 530 may internally implement a routine for determining the language used in a language object. In one embodiment, PPML language processor 530 may first look at print instructions in the print data, such as the language definition instruction, to determine which client PDL can be used to render a graphical object. For example, PPML language processor 530 may identify language definition instructions and use the language definition instructions to determine language enumerations 710-740. In one embodiment, PPML language processor 530 can analyze a portion of the language object to determine the language enumeration 710-740. Subsequently, PPML language processor 530 may then utilize table 700 to map language enumeration 710-740 to the corresponding language entry point functions 750-780.

For example, when PPML language processor 530 parses the XML code fragment:
<SOURCE Dimensions="100 100" Format="application/postscript">
PPML language processor 530 may identify the string "application/postscript" as a language definition instruction corresponding to language enumeration 710 for "PPML_POSTSCRIPT." PPML language processor 530 may then utilize table 700 to find language entry point function 750 corresponding to language enumeration 710. In this manner, PPML language processor 530 may find exemplary language entry point function 750 "ppml_PostscriptEntry," which is the function the PPML language processor 530 can use to invoke the PDL language processor 330 for PDL PostScript™ to process a language object written in exemplary client PDL PostScript™.

Page data processing using PDL can be illustrated through the following example. PPML language processor 530 may receive the exemplary instructions:

```
<?xml version="1.0" encoding="UTF-8"?>
<PPML>
  <PAGE_DESIGN TrimBox="0 0 612 792"/>
  <JOB Label="1">
    <DOCUMENT Label="1">
      <PAGE Label="1">
        <MARK Position="20 220">
          <VIEW/>
          <OBJECT Position="0 0">
            <SOURCE Dimensions="545 20" Format="application/
              postscript">
              <INTERNAL_DATA> << /PageSize [595 842] /
              ImagingBBox null>>
              setpagedevice /Helvetica findfont 16 scalefont setfont
              0 8 moveto
              (PostScript Selects A4) show</INTERNAL_DATA>
            </SOURCE>
            <VIEW/>
          </OBJECT>
        </MARK>
      </PAGE>
    </DOCUMENT>
  </JOB>
</PPML>
```

The instruction <PAGE_DESIGN TrimBox="0 0 612 792"/can set the paper dimensions to be letter size (8.5 inches by 11 inches) in page layout data 540. Upon parsing the instruction <SOURCE Dimensions="545 20" Format="application/postscript">, PPML language processor 530 may identify the string "application/postscript" as a language definition instruction corresponding to language enumeration 710 for "PPML_POSTSCRIPT." PPML language processor 530 may then utilize table 700 to find language entry point function 750 corresponding to language enumeration 710. PPML language processor 530 may find exemplary language entry point function 750 "ppml_PostscriptEntry," which is the function PPML language processor 530 can use to call PDL language processor 330 for exemplary client PDL PostScript™ to process a language object written in exemplary client PDL PostScript™.

At this point the PDL language processor 330 for PostScript™ PDL may be operating, and using PDL layout instruction <INTERNAL_DATA> <</PageSize [595 842]/ImagingBBox null>>setpagedevice/Helvetica findfont 16 scalefont setfont 0 8 moveto (PostScript Selects A4) show</INTERNAL_DATA>. Accordingly, the PDL language processor 330 for PostScript™ may attempt to change the paper size to A4. PPML language processor 530 may ignore the PDL layout instruction and may apply the PPML page layout data 540, to maintain the page layout as in letter size.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for processing Personalized Print Markup Language (PPML) print data for at least one document page, wherein the PPML print data comprises at least one language object described in at least one client page description language (PDL), the method comprising:
    parsing the PPML print data for the at least one document page to identify at least one language object written in the at least one client PDL;
    mapping the at least one language object to a language entry point function for a language processor for the at least one client PDL;
    calling the language processor for the at least one client PDL using the language entry point function; and
    processing the at least one language object using the language processor for the at least one client PDL.

2. The method of claim 1, wherein mapping the at least one language object to a language entry point function for the language processor for the at least one client PDL comprises using a table of language entry points.

3. The method of claim 2, wherein the table of language entry points comprises a plurality of language entry point functions and a plurality of language enumerations, and wherein the at least one language object is mapped to a selected language entry point function upon determining a selected language enumeration for the at least one language object.

4. The method of claim 3, wherein mapping the language object to the language entry point function for the language processor for the at least one client PDL comprises analyzing a portion of the language object to determine a language enumeration.

5. The method of claim 4, wherein mapping the at least one language object to the language entry point function for the language processor for the at least one client PDL comprises analyzing a Format attribute of a Source element of a PPML instruction.

6. The method of claim 1, wherein processing the at least one language object using the language processor for the at least one client PDL further comprises storing an output of the language processor to at least one memory location, wherein a starting address of the at least one memory location is provided to the language processor for the at least one client PDL.

7. The method of claim 6, wherein the starting address of the at least one memory location is provided to the language processor for the at least one client PDL at the time that the language processor for the at least one client PDL is called.

8. The method of claim 6, wherein the starting address of the at least one memory location is the address of a display list specific to the PPML print data.

9. The method of claim 1, further comprising:
    identifying page layout instructions and data in PPML for the at least one document page;
    disregarding page layout instructions and data returned from the language processor for the at least one client PDL; and
    applying the page layout instructions and data in PPML to format the at least one document page.

10. The method of claim 9, wherein the page layout instructions and data in PPML pertain to at least one of page size and graphical object size.

11. A computer-readable medium that contains instructions, which when executed by a processor perform steps in a method for processing Personalized Print Markup Language (PPML) print data for at least one document page, wherein the PPML print data comprises at least one language object described in at least one client page description language (PDL), the method comprising:
    parsing the PPML print data for the at least one document page to identify at least one language object written in the at least one client PDL;
    mapping the at least one language object to a language entry point function for a language processor for the at least one client PDL;
    calling the language processor for the at least one client PDL using the language entry point function; and
    processing the at least one language object using the language processor for the at least one client PDL.

12. The computer-readable medium of claim 11, wherein mapping the at least one language object to a language entry point function for the language processor for the at least one client PDL comprises using a table of language entry points.

13. The computer-readable medium of claim 12, wherein the table of language entry points comprises a plurality of language entry point functions and a plurality of language enumerations, and wherein the at least one language object is mapped to a selected language entry point function upon determining a selected language enumeration for the at least one language object.

14. The computer-readable medium of claim 13, wherein mapping the language object to the language entry point function for the language processor for the at least one client PDL comprises analyzing a portion of the language object to determine a language enumeration.

15. The computer-readable medium of claim 11, wherein mapping the at least one language object to the language entry point function for the language processor for the at least one client PDL comprises analyzing a Format attribute of a Source element of a PPML instruction.

16. The computer-readable medium of claim 11, wherein processing the at least one language object using the language processor for the at least one client PDL further comprises storing an output of the language processor to at least one memory location, wherein a starting address of the at least one memory location is provided to the language processor for the at least one client PDL.

17. The computer-readable medium of claim 16, wherein the starting address of the at least one memory location is provided to the language processor for the at least one client PDL at the time that the language processor for the at least one client PDL is called.

18. The computer-readable medium of claim 16, wherein the starting address of the at least one memory location is the address of a display list specific to the PPML print data.

19. A system for processing Personalized Print Markup Language (PPML) print data for at least one document page, comprising:
    an input interface configured to receive PPML print data, wherein the PPML print data comprises at least one language object described in at least one client Page Description Language (PDL);
    a memory configured to store the PPML print data; and a processor coupled to the input interface and the memory, wherein the processor is configured to execute instructions in the memory to perform the steps of:
  parsing the PPML print data for the at least one document page to identify at least one language object written in the at least one client PDL,
  mapping the at least one language object to a language entry point function for a language processor for the at least one client PDL,
  calling the language processor for the at least one client PDL using the language entry point function, and
  processing the at least one language object using the language processor for the at least one client PDL to create printable data.

20. The system of claim 19, wherein the printable data is stored in the storage device.

21. A method for processing page layout instructions using a page description language (PDL), the method comprising:
  invoking a processor for the PDL;
  parsing a PDL language object, using the processor for the PDL, to produce graphical output and identify at least one page layout instruction in PDL;
  upon identifying the at least one page layout instruction in PDL, determining if the processor for the PDL is operating in a Personalized Print Markup Language (PPML) mode;
  retrieving page layout instructions and data in PPML from a processor for a PPML if the processor for the PDL is operating in the PPML mode and applying the page layout instructions and data in PPML to the graphical output; and
  applying the at least one layout instruction in PDL to the graphical output if the processor for the PDL is not operating in the PPML mode.

22. The method of claim 21, further comprising receiving access at the processor for the PDL to the page layout instructions and data in PPML when the processor for the PDL is invoked.

23. The method of claim 21, wherein receiving access to the page layout instructions and data in PPML further comprises receiving an Application Programming Interface (API) at the processor for the PDL.

24. The method of claim 21, wherein the page layout instructions and data in PPML comprises at least one of page size data and graphical object size data.

25. The method of claim 21, wherein the at least one page layout instruction in PDL comprises at least one of a page size instruction and graphical object size instruction.

* * * * *